(12) United States Patent
Bellamy et al.

(10) Patent No.: US 10,789,576 B2
(45) Date of Patent: Sep. 29, 2020

(54) MEETING MANAGEMENT SYSTEM

(71) Applicant: International Business Machines Corporation, Armonk, NY (US)

(72) Inventors: Rachel Katherine Emma Bellamy, Bedford, NY (US); Jonathan Hudson Connell, II, Cortlandt-Manor, NY (US); Robert George Farrell, Cornwall, NY (US); Brian Paul Gaucher, Brookfield, CT (US); Jonathan Lenchner, North Salem, NY (US); David Osmond Scott Melville, New York, NY (US); Valentina Salapura, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 898 days.

(21) Appl. No.: 15/050,611

(22) Filed: Feb. 23, 2016

(65) Prior Publication Data

US 2017/0243171 A1    Aug. 24, 2017

(51) Int. Cl.
*G06Q 10/10* (2012.01)
*H04L 12/18* (2006.01)
*H04L 29/06* (2006.01)

(52) U.S. Cl.
CPC ..... *G06Q 10/1095* (2013.01); *H04L 12/1822* (2013.01); *H04L 65/403* (2013.01); *H04L 12/1818* (2013.01); *H04L 12/1831* (2013.01)

(58) Field of Classification Search
None
See application file for complete search history.

(56) References Cited

U.S. PATENT DOCUMENTS 7,007,235 B1 * 2/2006 Hussein .............. H04L 12/1822
                                                715/751
2014/0358632 A1 * 12/2014 Graff .................. G06Q 30/0224
                                                705/7.29

(Continued)

OTHER PUBLICATIONS

Alejandro Jaimes et al., Recording, Indexing, Summarizing, and Accessing Meeting Videos: An Overview of the AMI Project,</i> 14th International Conference of Image Analysis and Processing— Workshops (ICIAPW 2007) (Year: 2007).*

(Continued)

*Primary Examiner* — Christine M Behncke
*Assistant Examiner* — Matthew H Divelbiss
(74) *Attorney, Agent, or Firm* — Anthony Curro, Esq.; McGinn IP Law Group, PLLC

(57) ABSTRACT

A meeting management method, system, and non-transitory computer readable medium, include a target determination circuit configured to determine a target of an agenda for a meeting, the target of the agenda including which users correspond to a topic, a behavior capturing circuit configured to capture behavior of the users during the meeting, a tracking and identifying circuit configured to track the behavior of the users during the meeting and identify a user of the users corresponding to the behavior, and a difference determination circuit configured to determine if a difference between the behavior of the users and the target of the agenda is greater than a threshold value.

18 Claims, 8 Drawing Sheets

(56) References Cited

U.S. PATENT DOCUMENTS

2015/0154291 A1* 6/2015 Shepherd ................ G06F 16/95
707/748
2016/0344779 A1* 11/2016 Jain ........................ H04L 67/26

OTHER PUBLICATIONS

Gokhan Tur et al., The CALO Meeting Assistant System</i>, IEEE Transactions on Audio, Speech, and Language Processing, vol. 18, No. 6, Aug. 2010 (Year: 2010).*

Yang Shi et al., MeetingVis: Visual Narratives to Assist in Recalling Meeting Context and Content</i>, IEEE Transactions on Visualization and Computer Graphics, vol. 24, No. 6, Jun. 2018 (Year: 2018).*

* cited by examiner

MEETING MANAGEMENT SYSTEM

BACKGROUND

The present invention relates generally to a meeting management system, and more particularly, but not by way of limitation, to a meeting management system for conversational topic tracking and agenda intervention.

Meetings often get off track (e.g., off topic) and devolve into discussions of side topics, or fail to make it through all scheduled agenda topics in an allotted time. As it is difficult to find a time when all participants can assemble, and a delay in decision-making can lead to an overall slowdown in a project, conventional techniques have been proposed to have meetings more closely follow their proposed or planned agendas.

Conventional techniques provide a possible metric for meeting effectiveness as covering the agenda items, but these conventional techniques do not use this metric for automatic meeting facilitation.

Other conventional techniques address how to signal deviations from meeting agenda and meeting discussion with respect to topics/conversation (e.g., keywords), but not with respect to the physical context of the meeting (e.g., people, location) as detected by sensors or the like.

Thus, there is a technical problem in that the conventional techniques are incapable of automatically detecting digressions and intervening to put the meeting back on track and nor do the conventional techniques provide a determination of which topics had been covered versus which remain could be used to generate cues to improve time allocation during meetings to similarly make them more effective.

SUMMARY

In an exemplary embodiment, the present invention can provide a meeting management system, including a target determination circuit configured to determine a target of an agenda for a meeting, the target of the agenda including which users correspond to a topic, a behavior capturing circuit configured to capture behavior of the users during the meeting, a tracking and identifying circuit configured to track the behavior of the users during the meeting and identifying a user of the users corresponding to the behavior, and a difference determination circuit configured to determine if a difference between the behavior of the users and the target of the agenda is greater than a threshold value.

Further, in another exemplary embodiment, the present invention can provide a non-transitory computer-readable recording medium recording a meeting management program, the program causing a computer to perform: determining a target of an agenda for a meeting, the target of the agenda including which users correspond to a topic, capturing behavior of the users during the meeting, tracking and identifying the behavior of the users during the meeting and identifying a user of the users corresponding to the behavior, and determining if a difference between the behavior of the users and the target of the agenda is greater than a threshold value.

Even further, in another exemplary embodiment, the present invention can provide a meeting management method, including determining a target of an agenda for a meeting, the target of the agenda including which users correspond to a topic, capturing behavior of the users during the meeting, tracking and identifying the behavior of the users during the meeting and identifying a user of the users corresponding to the behavior, and determining if a difference between the behavior of the users and the target of the agenda is greater than a threshold value.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

Figure 1:
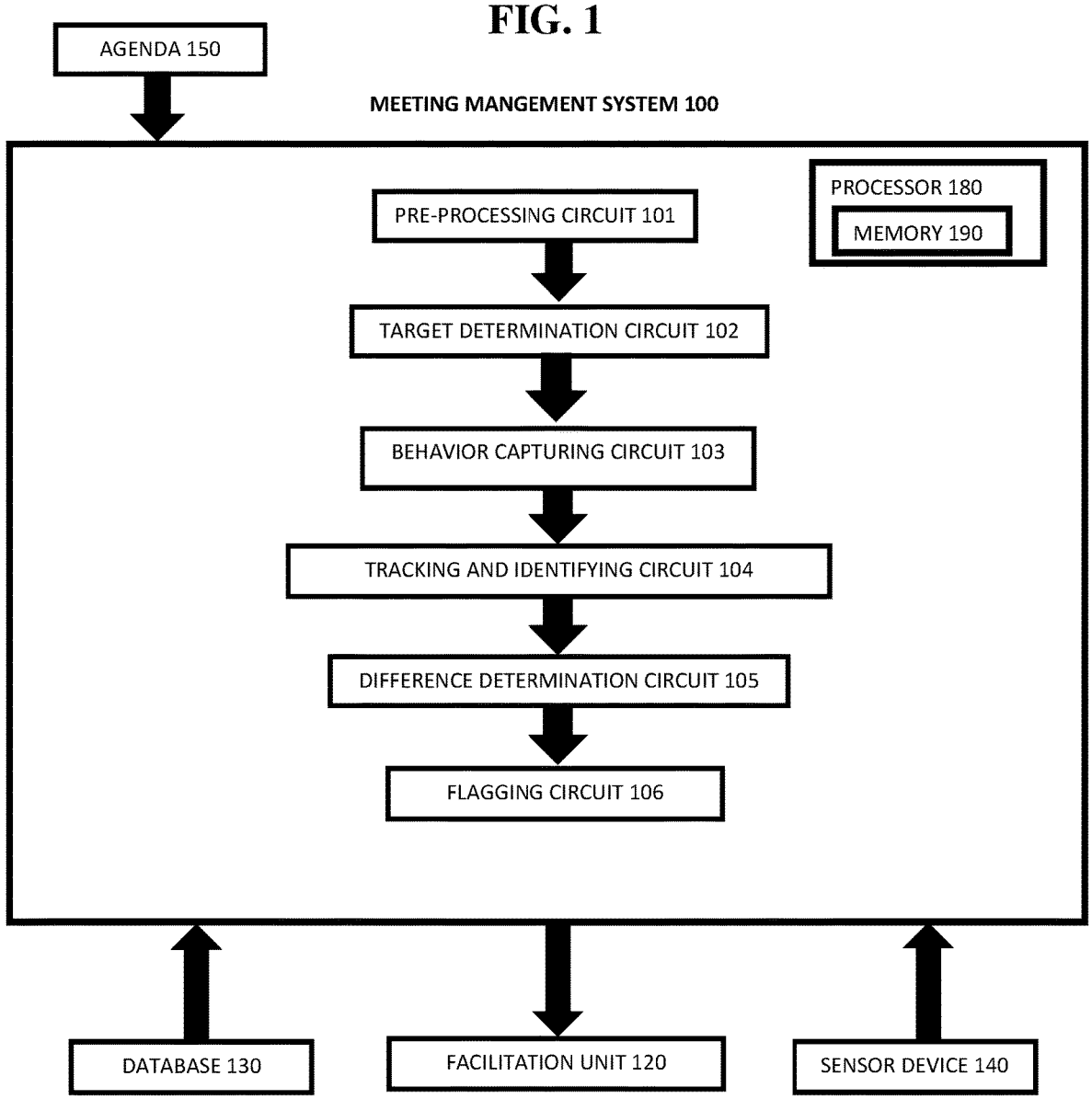
FIG. 1 exemplarily shows a block diagram illustrating a configuration of a meeting management system 100.

The invention will now be described with reference to FIGS. 1-8, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the meeting management system 100 includes a pre-processing circuit 101, a target determination circuit 102, a behavior capturing circuit 103, a tracking and identifying circuit 104, a difference determination circuit 105, and a flagging circuit 106. The meeting management system 100 includes a processor 180 and a memory 190, with the memory 190 storing instructions to cause the processor 180 to execute each circuit of meeting management system 100. The processor and memory may be physical hardware components, or a combination of hardware and software components.

Although the meeting management system 100 includes various circuits, it should be noted that a meeting management system can include modules in which the memory 190 stores instructions to cause the processor 180 to execute each module of meeting management system 100.

Also, each circuit can be a stand-alone circuit, unit, etc. that can be interconnected to cooperatively produce a transformation to a result.

With the use of these various circuits, the meeting management system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (including musculoskeletal gestures, speech gestures, eye movements, internal physiological changes, measured by imaging circuits, microphones, physiological and kinematic sensors in a high dimensional measurement space, etc.) within a lower-dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower-dimensional feature space, is used to identify the emergence of a certain cognitive states over that period of time. One or more preferred embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a cognitive state. The present application also describes the analysis, categorization, and identification of these cognitive states by means of further feature analysis of subgraphs, including dimensionality reduction of the subgraphs, for example by means of graphical analysis, which extracts topological features and categorizes the resultant subgraph and its associated feature nodes and edges within a subgraph feature space.

Figure 6:
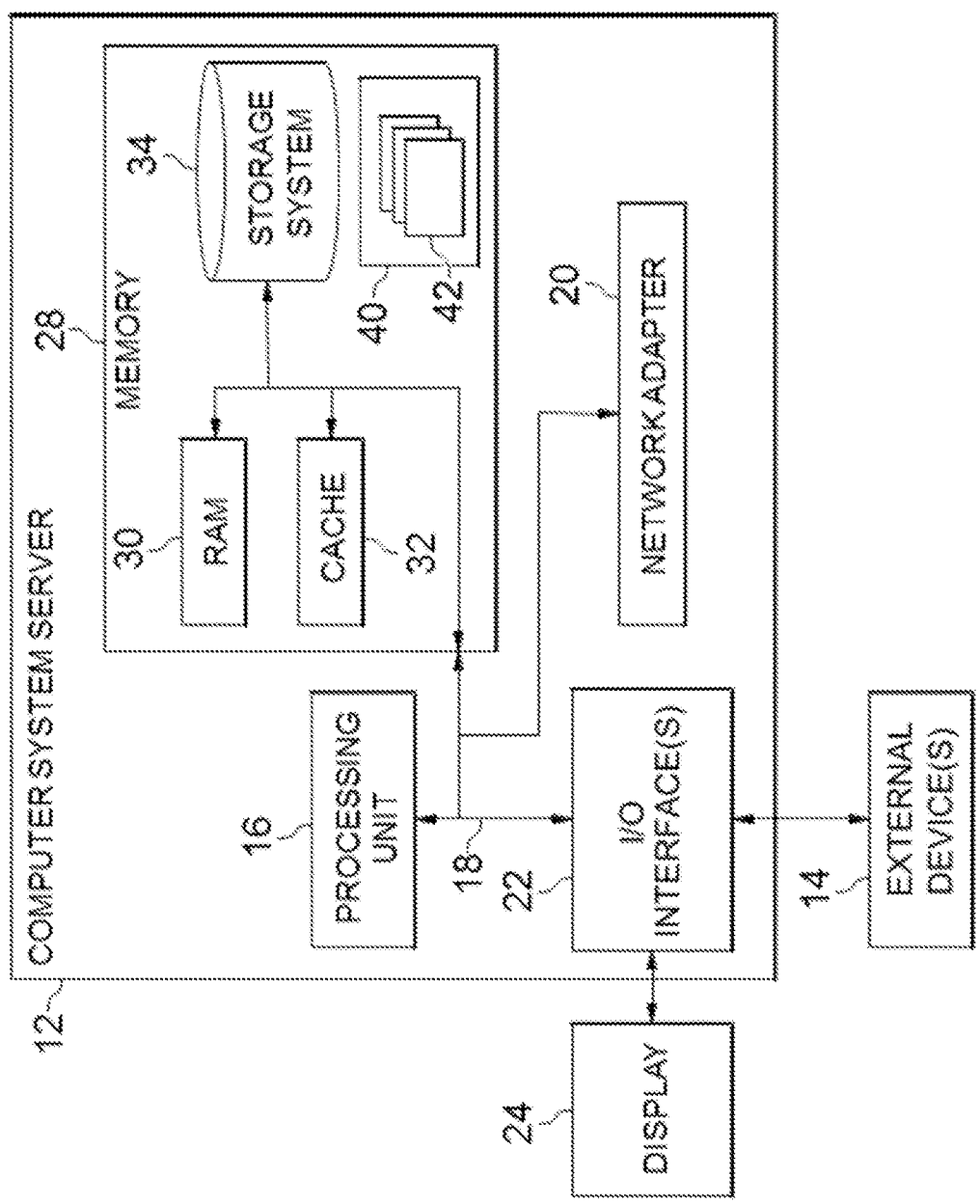
FIG. 6 depicts a cloud computing node 10 according to an embodiment of the present invention.
Figure 7:
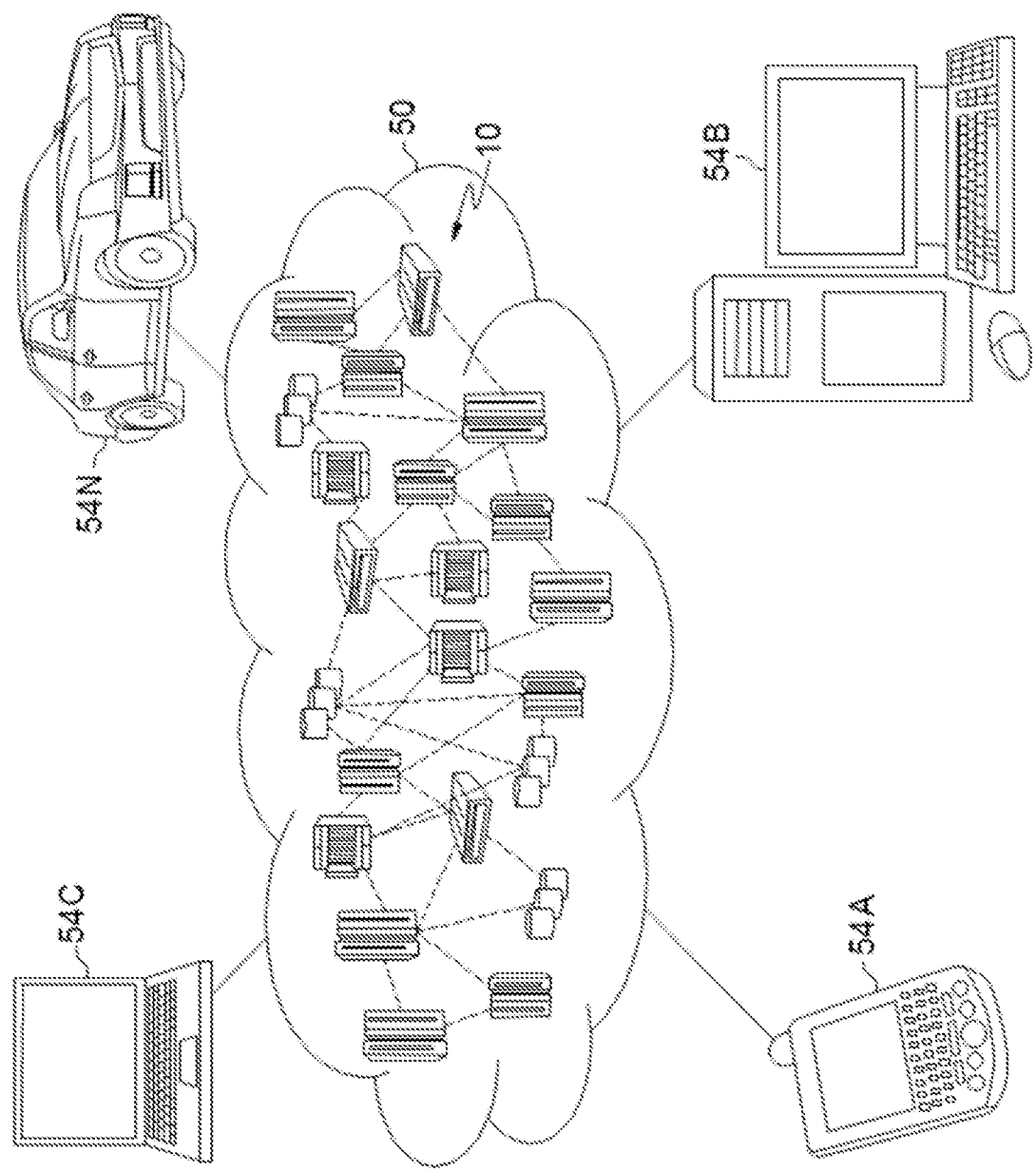
FIG. 7 depicts a cloud computing environment 50 according to another embodiment of the present invention.
Figure 8:
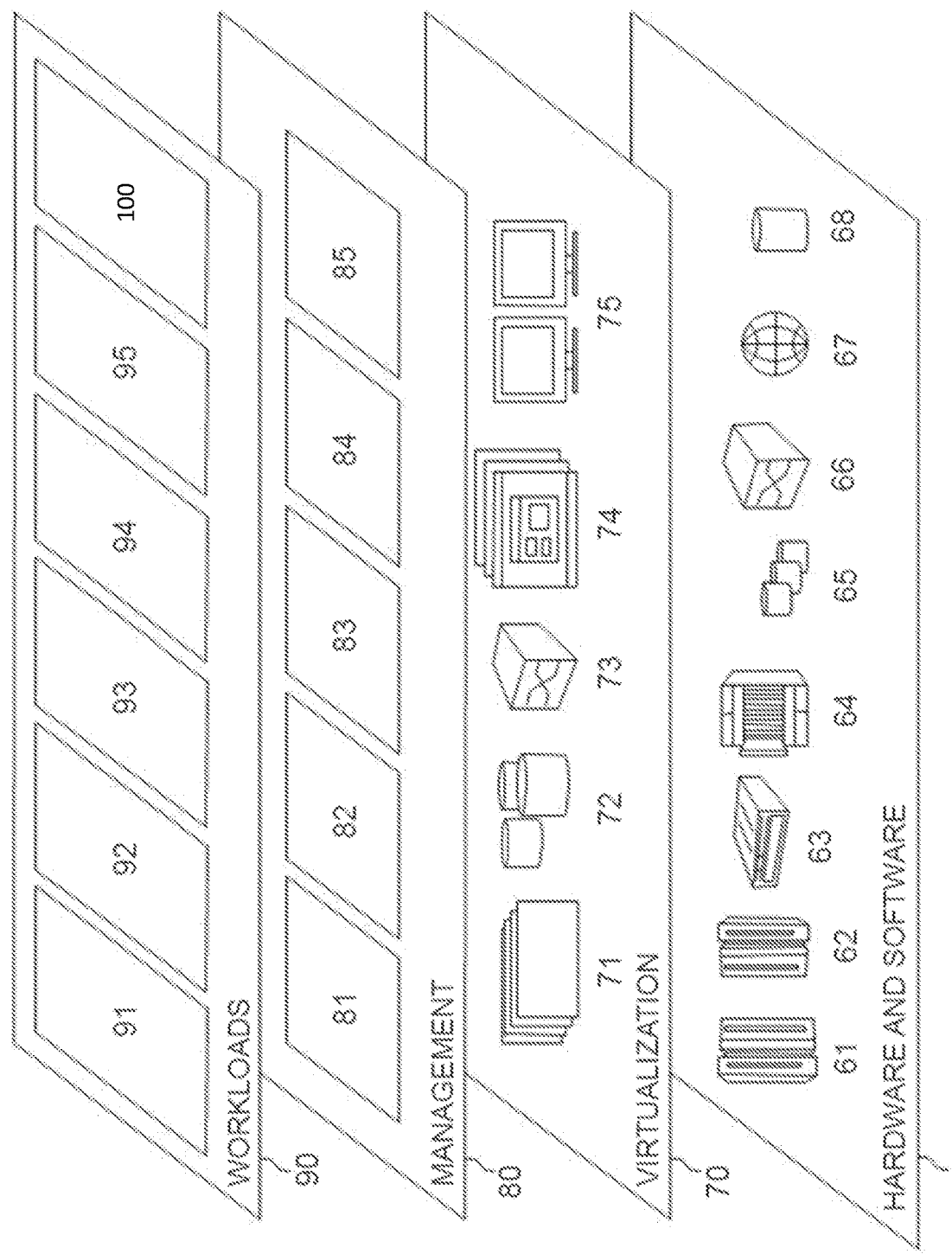
FIG. 8 depicts abstraction model layers according to an embodiment of the present invention.

Although as shown in FIGS. 6-8 and as described later, the computer system/server 12 is exemplarily shown in cloud computing node 10 as a general-purpose computing circuit which may execute in a layer the meeting management system 100 (FIG. 8), it is noted that the present invention can be implemented outside of the cloud environment.

The meeting management system 100 receives a textual description of a planned meeting (i.e., an agenda 150). The agenda 150 can include desired/optional times 340 (e.g., see FIG. 3) for topics, participants to discuss those topics, locations to have those discussions, etc.

Based on the agenda 150, a number of conceptual topics for discussion can be extracted by the pre-processing circuit 101. A number of expected words are associated with each topic. For example, as exemplarily shown in FIG. 3, the agenda 150 includes keywords 320 and names 330 which are analyzed by the pre-processing circuit 101. The pre-processing circuit 101 associates "who" should be talking during a meeting based on the text of the agenda 150 (i.e., the names 330), the topics, and the keywords 320.

Figure 3:
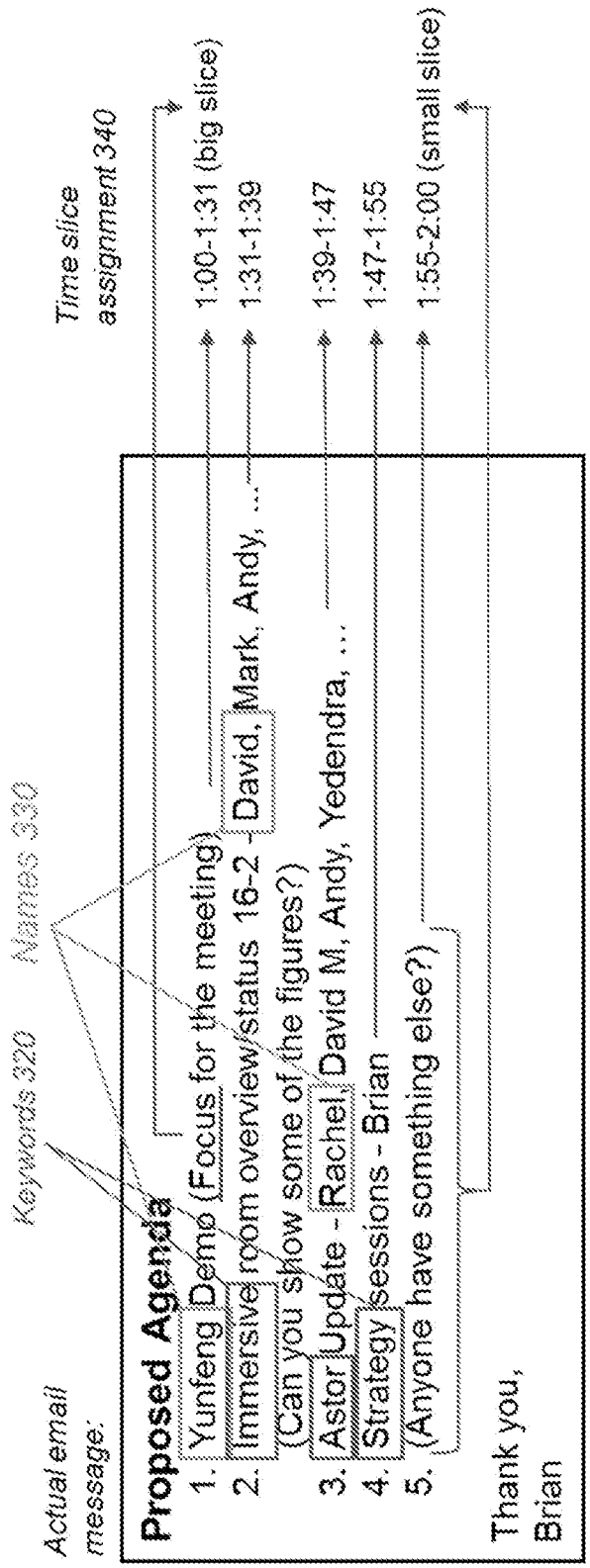
FIG. 3 exemplarily shows pre-processing of an agenda 150.
Figure 4:
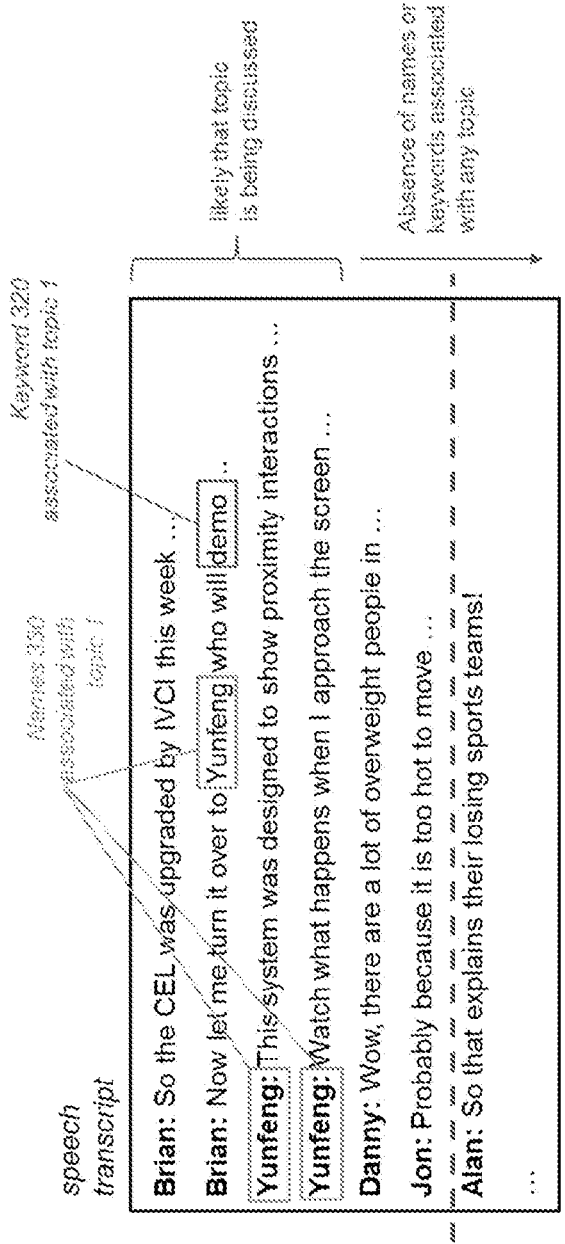
FIG. 4 exemplarily shows finding digression of a meeting using the agenda 150.

The pre-processing circuit 101 also can determine a location associated with the topics of the agenda 150 and names 330 in the agenda 150. That is, as shown in FIG. 3, the pre-processing circuit 101 can identify that "Astor" is a specific location in which "Rachel", "David M.", "Andy", and "Yedendra" should be located during that portion of the agenda 150 (i.e., at the "Astor" building").

The input description of a meeting (i.e., agenda 150) has no specific format and may be any of a single paragraph, a list of topics, a prioritized list, and/or a list with suggested time allocations.

From the input sequence of the agenda 150, a set of target topics, the person who should be talking, and the location of the meeting can be determined in a number of ways by the target determination circuit 102. For example, the target determination circuit 102 can take top-level text entries in an outline as topics directly. The target determination circuit 102 can also use a pre-existing ontology of concepts, each associated with a collection of keywords or phrases. These keywords could be correlated with the raw text of the meeting description to select the importance and ordering of the pre-existing topics. Note that the agenda 150 may not be complete. In this case, the target determination circuit 102 may compute a target amount of time and/or break down topics, subtopics, dividing time between them. This can be done based on keywords 320 such as "important", "main topic", etc. indicating that a topic on the agenda 150 should receive more time than a topic associated with keywords 320 that indicate brevity of discussion for a topic.

Further, the target determination circuit 102 can assign a priority and an optimal dwell time to each extracted topic by the pre-processing circuit 101. This can be done by dividing the time evenly between all the topics (with equal priorities), giving more time to topics with longer textual descriptions, or considering the first N topics as essential (high priority) and assigning M % of the meeting time to them, while assigning the remaining time to the remaining topics (again, perhaps divided evenly). For example, the target determination circuit 102 can determine a number of expected words for each topic and accordingly associate a time to spend on the topic based on the expected words for the topic.

Also, the target determination circuit 102 can determine the expected words to be discussed based on the topic. Based on the target agenda 150 and planned time, the target determination circuit 102 can suggest splitting of the meeting into multiple meetings.

The target determination circuit 102 can determine "who" (i.e., the specific person) is associated with a particular topic based on the names 330 and keywords 320 associated with a topic in the agenda 150.

The behavior capturing circuit 103 captures the behavior of the participants of the meeting. Behavior can include speech utterances, typed text, gestures, actions on a Graphical User Interface (GUI), displayed content, etc. that reflect what is occurring during the meeting. That is, during the meeting, the behavior capturing circuit 103 extracts words from the auditory stream over time or uses a sensor device 140 to capture an image of the speaker. The words are then correlated with expected words for each topic to infer which topic (if any) is being discussed at each time.

It should be noted that the sensor device 140 can include an imaging means, an audio detection means, a motion detection means, etc. That is, the sensor device 140 is capable of measuring any behavior of a participant of the meeting using multiple measuring capabilities.

The behavior capturing circuit 103 can use facial recognition in order to capture who is speaking based on an image captured by the sensor device 140.

The tracking and identifying circuit 104 continuously tracks the behavior of the meeting and identifies who is speaking and topic categories based on the behavior. That is, the association of keywords and phrases with a topic could be of a static, hand-generated set of weighted inference links. Alternatively, the word lists and weights can be generated automatically based on the statistical correlation of words in documents about a certain topic as compared to the correlation of these same words in documents concerning a different topic (e.g. compared with a different topic on the meeting agenda, compared with the least closely correlated topic in the meeting agenda vs. background English language usage of words—to give various degrees of being "off-topic"). Or, the correlations might be constructed hierarchically wherein a top level topic suggests several mid-level topics which, in turn, suggest further low-level topics. Here, it may be that only low-level topics are specific enough to have high word/phrase correlations, or topics at all levels may suggest certain words with varying confidences.

The tracking and identifying circuit 104 continuously tracks and identifies who is speaking. During the meeting, speech recognition can be performed by the behavior capturing circuit 103 for one or more of the participants. This recognition phase might include dedicated audio streams from each participant, developed through remote acoustic beam forming or by a collection of local microphones. The recognition phase performed by the behavior capturing circuit 103 might also include customized acoustic models for known speakers stored in the database 130 to improve the quality of the speech transcript. Specialized language models or grammars tailored to the likely subject matter or domain of the meeting might also be employed to boost fidelity. The person who is speaking can also be tracked and identified using facial recognition based on an image captured by the sensor device 140.

The tracking and identifying circuit 104 can identify topic categories that a person is speaking about based on the behavior by, for example, the inference of a topic from either text or a speech transcript within a mathematical weighting framework. Also, the tracking and identifying circuit 104 can utilize term frequency, inverse document frequency (TF-IDF). Alternatively, the influences of various keywords could be combined more directly based on probabilities. This can be done by using suitable (e.g. Bayesian) methods to estimate p(topic|word) or p(topic|word distribution) and error bars on these estimates, using suitable assumptions about independence between different keywords and multiple occurrences of the same keyword Further, the tracking and identifying circuit 104 can track and identify words in the meeting versus the agenda 150 by applying "thesaurus amplification" to both the agenda 150 and the speech transcript as captured by the behavior capturing circuit 103. The "thesaurus amplification" can use key words in each separate document to suggest additional keywords for that document. For example, if the behavior capturing circuit 103 captures "network bandwidth", this might dredge up the strongly related terms "router", "Ethernet", "IPv4", "fiber optic", and "NIC". Such a method expands a short piece of text into a conceptually much longer one. Another possibility is to require people to be more precise about their agenda 150. This could be done, for example, by pointing to a draft document, presentation, Wikipedia page, web site of an academic group, etc. in the invitation and then "scraping" these auxiliary sources for additional related concepts. Still another method would be to require an elaborated speech description at the start of every meeting to reiterate the agenda and topics to be discussed. This would provide more agenda text to work with, but from the speech transcript rather than a written pre-meeting invitation.

Also, the tracking and identifying circuit 104 compares expected words of the meeting against the recognized words during the meeting by the behavior capturing circuit 103.

Additionally, the tracking and identifying circuit 104 can track and identify the location of a person who is speaking. This can be done by using a phone line location, associating the device in a room with the location of the person speaking, using surroundings of a captured image by the sensor device 140, GPS location tracking, etc. For example, if a user calls into a meeting from a home phone, the tracking and identifying circuit 104 identifies that the user is in a different location.

Based on the data of the tracking and identifying circuit 104, the difference determination circuit 105 determines if a difference between the behavior captured by the behavior capturing circuit 103 as associated with a person speaking and a target of the meeting based on the agenda 150 is greater than a predetermined threshold. For example, if a person is discussing elephants when the meeting is about profit margins, the difference determination circuit 105 determines that the difference between the behavior of the person discussing elements and the target of the meeting for profit margins is greater than a threshold.

Figure 5:
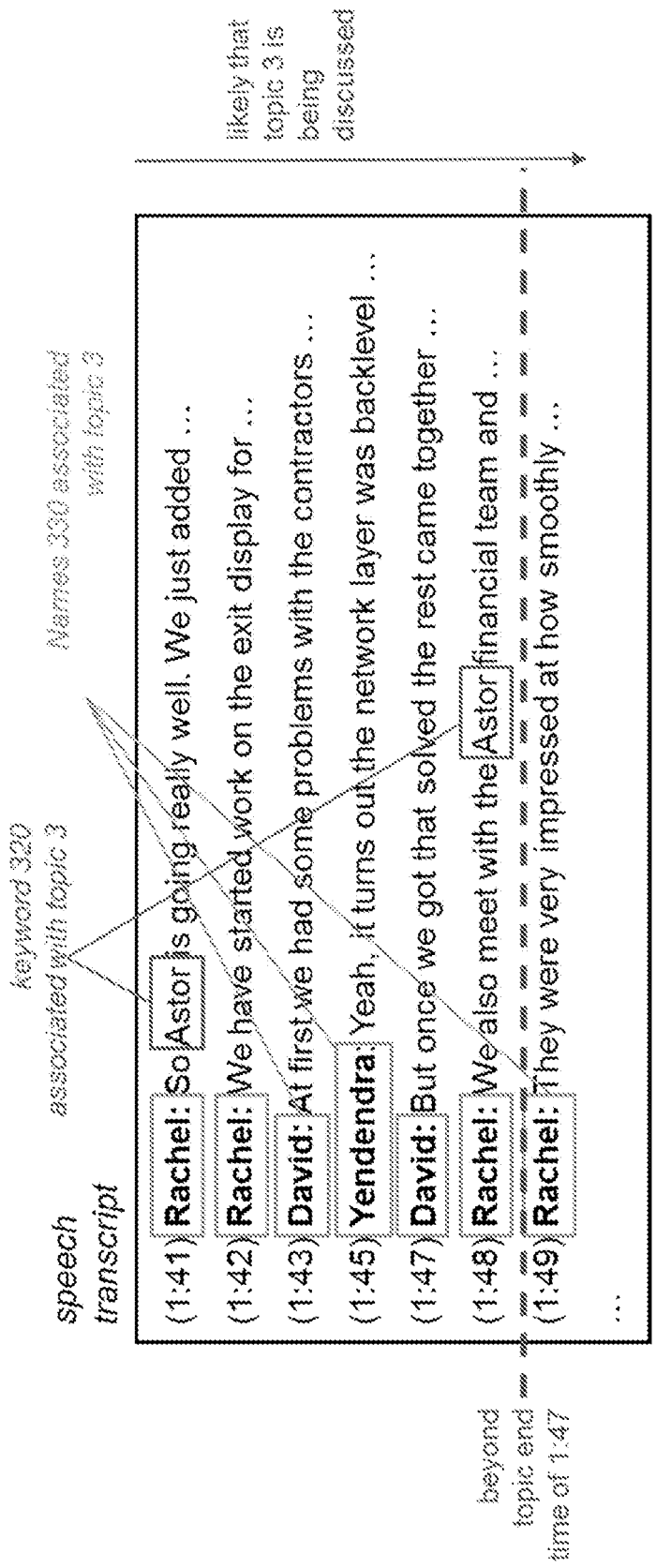
FIG. 5 exemplarily shows detecting dwell time of the meeting using the agenda 150.

The difference determination circuit 105 can determine if an incorrect person is speaking. For example, as exemplarily shown in FIG. 4, names 330 (i.e., "Yunfeng") are associated with topic 1 as seen in FIG. 3 and keywords 320 (i.e., "demo") are also associated with topic 1. Similarly, as shown in FIG. 5, names 330 and keywords 320 are each associated with topic 3. Therefore, the difference determination circuit 105 determines that there is no digression (i.e., an incorrect person is not speaking) between who is speaking and who should be speaking when discussing a topic. However, as further shown in FIG. 4, the difference determination circuit 105 determines that when "Jon" and "Alan" speak that "who" is speaking is different than what is stated on the agenda 150. Thus, the difference determination circuit 105 determines a difference from the agenda 150 based on who is speaking.

Also, even if the "correct" person is speaking about a topic based on comparing the names 330 and the keywords 320, the difference determination circuit 105 can determine if there is an excessive dwell time on a topic or if the person is off-topic. For example, if there is a sequence of words uncorrelated with an extracted topic (i.e., not keywords 320) captured by the behavior capturing circuit 103, the difference determination circuit 105 determines that there exists a "digression" (i.e., difference from the agenda 150) and the meeting participants are signaled about this event (as described later). The difference determination circuit 105 determines the degree of the difference or digression. That is, if "Yunfeng" begins to speak words completely unrelated to the keyword 320 "demo", the difference determination circuit 105 determines that even though the correct user is speaking, that the user has digressed from the topic and the agenda is off-topic.

The sequence of inferred topics over time is compared with the initial agenda 150 to determine which topics have and have not been covered up to the current time. This can be used to roll-over uncovered topics to future meetings. It can also be used to suggest moving on to a different topic if it looks likely that all the agenda items will not be covered in the time allotted.

"Target" as referenced above can be, for example, a point in time during the meeting when an assessment is done. For example, after 15 minutes into an hour long meeting everyone should be assembled and starting to discuss the first topic. Also, "difference" can be, for example, a long sequence of words uncorrelated with an agenda 150 topic, a participant who is discussing a later topic, a participant not on the agenda 150 who is talking, and interruptions. Further, "threshold" can be based on a factor of a time (i.e., if a meeting diverges for more than 5 minutes from schedule), a topic (i.e., meeting is more than 50% off-topic sentences), participants (i.e., more than two people not on the invite list), and a location (i.e., meeting has started in wrong location).

The difference determination circuit 105 can identify a person in the meeting who caused the difference (i.e., digression) between the meeting and the agenda 150 and issue a notification. Further, when the difference determination circuit 105 determines the meeting as digressed, and depending on the energy and excitement levels of participants, the difference determination circuit 105 can signal discussion interrupt.

It is noted that the determination of being off-topic can be done on approximately a paragraph's worth of text at a time. Thus, the chunks of text used to obtain Bayesian priors would be approximately a paragraph in length, though these paragraphs should not always be taken at paragraph or even sentence boundaries since in speech transcription there are no clear paragraph demarcations (or even, generally, sentence demarcations). The frequency of occurrence of words in these pseudo-paragraphs should be compared with the words in the remainder of the document and the words in all other documents fetched from a web search using the topic description.

The difference determination circuit 105 can continuously learn, based on previous meetings, particular users, topics, or other items that cause a meeting to digress. In this manner, the difference determination circuit 105 acts as a cognitive unit. Based on the repeat occurrences that derail a meeting, the difference determination circuit 105 can pre-emptively signal the system that the meeting will derail before it occurs.

Also conceivable, if difference determination circuit 105 determines that the meeting has a difference from the agenda 150, the difference determination circuit 105 can also gauge the meeting participant's dissatisfaction with this fact. For example, if it is determined by the difference determination device 105 that one person going off topic for a long time and no one else talking then it is likely that the flagging circuit 106 should flag the meeting. However, if the meeting has gone off topic but the participants are energized (as determined by using speech and vocal clues), the difference determination circuit 105 will not issue a signal to the flagging circuit 106 since the meeting being off topic seems to improve the meeting.

Based on the difference determined by the difference determination circuit 105, the flagging circuit 106 flags the difference. Flagging by the flagging circuit 106 can include notifying the leader of the meeting, announcing the difference between the behavior and the target using a generated voice that can be heard by the participants, notating difference from the meeting agenda 150, control of a lighting sequence at the meeting's location, etc.

That is, based on a difference between who is speaking and who should be speaking, who is speaking and what they are speaking about as it is related to the topic, who is speaking and where they are speaking as related to where they should be speaking from, the topic being discussed, and the time the topic is being discussed for, the difference determination circuit 105 determines the difference and causes the flagging circuit 106 to flag the meeting that a difference is occurring.

The difference determined by the difference determination circuit 105 can cause the flagging circuit 106 to utilize a facilitation unit 120 as an intelligent meeting facilitator, which, based on the flagging circuit 106, triggers appropriate facilitation statements output by the facilitation unit 120 to guide the meeting back on track.

An alternative user interface as the facilitation unit 120 can be a visualization of the agenda topics that have been covered and what has yet to be covered. Another example is to show, for the given topic how on/off topic the group is currently deemed to be with a view meter. The meter may indicated "on topic" by a needle pointing into the middle of a green region and "off topic" by the needle pointing into a red region.

Yet another alternative for the facilitation unit 120 based on the flagging circuit 106 flagging the meeting can be to privately prompt individual participants to change the meeting topic, that it was time to stop talking about the current topic, or to start talking about one of the following topics that had yet to be covered.

If a reason that the flagging circuit 106 is flagging the meeting is due to a digression caused by the same user(s) multiple times, the facilitation unit 120 can be configured to output a notification directly to the user(s) or to the user(s) supervisor(s).

The facilitation unit 120 can also split a meeting into multiple parts based on the flagging by the flagging circuit 106.

Further based on the meeting being flagged by the flagging circuit 106, prompts and/or suggestions for future meeting topics or agenda items can be provided after the meeting by the facilitation unit 120 based on analysis of agenda items that had not been covered, items that had been covered, metrics such as an amount of time devoted to an agenda topic and the people that had participated in the conversation about an item.

Also, the system 100 can include prompts and/or suggestions for future meetings topics or agenda items which are provided after the meeting based on analysis of agenda items that had not been covered, items that had been covered, metrics such as amount of time devoted to agenda topic and who had participated in the conversation about an item. This can be done by the flagging circuit 106.

Also, if the meeting has gone off topic, to gauge the group's dissatisfaction with this fact. For example if it is one person going off topic for a long time and no one else talking then the chances are it's a problem and the automated facilitator should step in. On the other hand, if the meeting has gone off topic but the participants seem energized (using speech and vocal clues), it may be that the automated facilitator should just indicate that the meeting seems to have veered off topic but not interrupt. In other words, the flagging circuit 106 can either flag or not flag based on a conduct of the meeting.

Utterances from non-participants can be filtered by including audio just from certain microphones, using speaker identify verification and checking against the meeting invite list, using active badges, or other means as detected by the sensor device 104.

Figure 2:
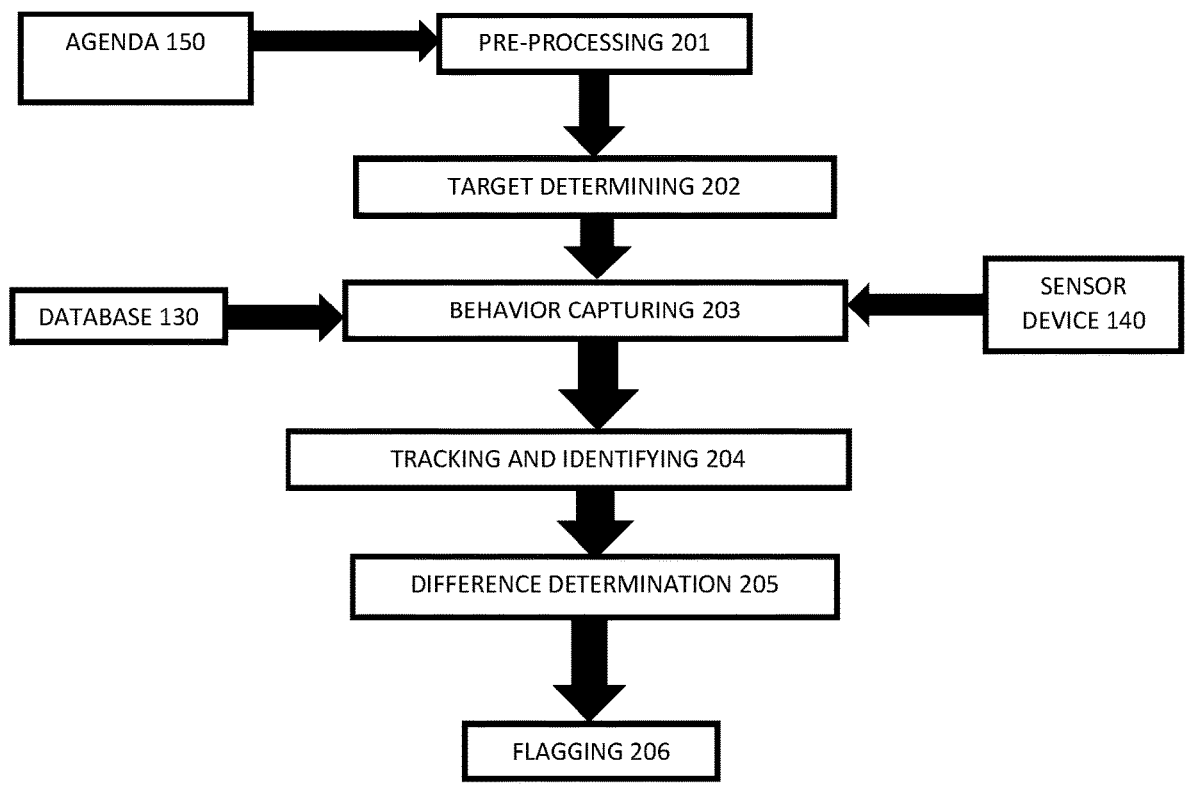
FIG. 2 exemplarily shows a high level flow chart for a meeting management method 200.

FIG. 2 shows a high level flow chart for a method 200 of meeting management.

Step 201 receives an agenda 150 and pre-processes the agenda by extracting a number of conceptual topics. A number of expected words are associated with each topic. For example, as exemplarily shown in FIG. 3, the agenda 150 includes keywords 320 and names 330 which are analyzed in Step 201. Step 201 associates "who" should be talking during a meeting based on the text of the agenda 150 (i.e., the names 330), the topics, and the keywords 320. For example, for a topic like "ion implantation progress" it would be natural to assume that, Joe, the manager of the ion implantation lab (as determined by a database look up) would be speaking if no one else was called out explicitly.

Step 201 can determine a location associated with the topics of the agenda 150 and names 330 in the agenda 150. That is, as shown in FIG. 3, Step 201 can identify that "Astor" is a specific location in which "Rachel", "David M.", "Andy", and "Yedendra" should be located during that portion of the agenda 150 (i.e., at the "Astor" building"). Conversely, from a given set of people a default location could be inferred. For example, Lior and Zeva are both from the Israel research lab (as determined from the personnel database) and hence are likely to be calling in from the Haifa building.

Step 202 determines the target of the agenda 150 by determining a set of target topics, who should be talking, the location of the meeting, etc.

Step 203 captures the behavior of the participants of the meeting. Step 203 can capture the audio of the users of the meeting and compare the audio sample with a sample pre-recorded and stored in a database 130 to confirm the identity of the user. Also, step 203 captures an image of the speaker using a sensor device 140. The identity of remote participants can often be inferred from the phone number they are calling from (e.g. Tom's office means it is likely Tom speaking). Similarly, the location of a remote user can often also be determined by phone number (e.g. Tom's office is in Yorktown, N.Y.). The location of physical participants can be inferred from the known location of the sensing device used to identify them. For example, Kevin is speaking on microphone 7 which is known to be in room 12-001 so Kevin must also be in room 12-001.

Step 204 continuously tracks the behavior of the meeting and identifies who is speaking. It may also identify topic categories based on the behavior of step 203. Determining which participant is speaking might be as simple as checking the audio volume on some particular input line. Alternatively, a visual analysis circuit might use sensing device 140 to detect motion in the mouth region of a participant's face.

Based on the data of the tracking and identifying in step 204, step 205 determines if a difference between the behavior captured by step 203 and a target of the meeting based on the agenda 150 is above a predetermined threshold. This could be done by, for example, noticing that the current speaker is unexpected, even in the absence of speech transcription data If the difference of step 205 is above the threshold, step 206 flags the meeting that the meeting is off topic and remedial action can be taken to, for example, put the meeting back on-track.

That is, Step 206 can use an interface for displaying and flagging the difference in step 206. A visualization of the agenda topic shows what topics have been covered and what has yet to be covered. There is a meter for the current topic that shows how on-topic or off-topic the group is. On-topic is indicated by a needle pointing into the middle of a green region, and when off topic the needle points into a red region.

Another important bit of information is who is taking the meeting off-track. There is a threshold for the number of times a given individual can be the one who takes the meeting off-track. If participant-specific threshold is above a minimum, a messages is delivered to the guilty party or parties privately. Step 206 can be configured to send a mobile text message (i.e., a flag) to the parties or to display a message on a graphical user interface on the private computer of the individual or both. The message can include the portion of the "difference" that is due to the individual. For example, indicating the agenda topic and who is supposed to be speaking and showing how long the "offending" individual has been speaking.

Note that a private message can also be sent to the person responsible for the next meeting topic to implement the step 206 of putting the meeting back on track.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 6, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 7, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud computing environment 50 can communicate with any type of computerized circuit over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the meeting management system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A meeting management system, comprising:
   a target determination circuit configured to determine a target of an agenda for a meeting, the target of the agenda including which users correspond to a topic on the agenda;
   a behavior capturing circuit configured to capture behavior of the users during the meeting;
   a tracking and identifying circuit configured to track the behavior of the users during the meeting and identify a user of the users corresponding to the behavior;
   a difference determination circuit configured to determine if a difference between the behavior of the users and the target of the agenda for the topic is greater than a threshold value; and
   when the difference is greater than the threshold value, intervening in the meeting to interrupt the behavior of the users to guide the behavior back to the topic on the agenda, wherein the tracking and identifying circuit identifies a topic of the agenda currently being discussed based on the user corresponding to the behavior and the behavior compared to the agenda, wherein the difference determination circuit determines which user of the users caused the difference to be greater than the threshold value, wherein the target of the agenda for the meeting is obtained via an agenda ingest process of dividing a text of the agenda into an expected sequence of two or more topics and computing a feature representation for each topic, wherein the tracking the behavior of the users during the meeting is performed via a meeting interpretation process including transcribing speech into a transcript during the meeting, chunking the transcript into two or more temporal segments, and computing a feature representation for each segment, and wherein the intervening determines to intervene via an alerting process that includes comparing the feature representation for each segment against the feature representation for each topic and reporting deviations from the expected sequence of topics.

2. The system of claim 1, wherein the difference determination circuit determines if a user not corresponding to the topic is speaking based on a difference between the identified user and the target of the agenda.

3. The system of claim 2, wherein the target determination circuit predicts a set of behavior expected for the topic, and wherein the difference determination circuit determines if a difference between the set of behavior expected for the topic and the behavior of the identified user corresponding to the topic is greater than a threshold value such that the difference determination circuit determines that the user corresponding to the topic has digressed from the target of the agenda.

4. The system of claim 3, wherein the tracking and identifying circuit tracks and identifies a location of the user during the meeting, and wherein the difference determination circuit determines if the location of the user is different than a target location according to the agenda.

5. The system of claim 4, wherein the difference between the behavior of the user and the target of the agenda comprises a digression.

6. The system of claim 3, wherein if the difference between the behavior of the user and the target of the agenda is greater than the threshold value, the target determination circuit modifies the target of the agenda.

7. The system of claim 1, further comprising a flagging circuit configured to flag the meeting if the difference between the behavior of the user and the target of the agenda is greater than the threshold value.

8. The system of claim 1, wherein the target determination circuit determines the target of the agenda for the meeting by allocating an amount of time per each topic of the agenda based on a priority level of each topic of the agenda.

9. The system of claim 1, wherein the tracking and identifying circuit identifies a topic of the agenda currently being discussed based on the user corresponding to the behavior and the behavior compared to the agenda.

10. The system of claim 1, wherein the temporal segments comprise at least a paragraph of length of speech.

11. A non-transitory computer-readable recording medium recording a meeting management program, the program causing a computer to perform:

determining a target of an agenda for a meeting, the target of the agenda including which users correspond to a topic on the agenda;

capturing behavior of the users during the meeting;

tracking and identifying the behavior of the users during the meeting and identifying a user of the users corresponding to the behavior;

a second determining if a difference between the behavior of the users and the target of the agenda for the topic is greater than a threshold value; and when the difference is greater than the threshold value, intervening in the meeting to interrupt the behavior of the users to guide the behavior back to the topic on the agenda, wherein the tracking and identifying identifies a topic of the agenda currently being discussed based on the user corresponding to the behavior and the behavior compared to the agenda, wherein the second determining further determines which user of the users caused the difference to be greater than the threshold value, wherein the target of the agenda for the meeting is obtained via an agenda ingest process of dividing a text of the agenda into an expected sequence of two or more topics and computing a feature representation for each topic, wherein the tracking the behavior of the users during the meeting is performed via a meeting interpretation process including transcribing speech into a transcript during the meeting, chunking the transcript into two or more temporal segments, and computing a feature representation for each segment, and wherein the intervening determines to intervene via an alerting process that includes comparing the feature representation for each segment against the feature representation for each topic and reporting deviations from the expected sequence of topics.

12. The non-transitory computer-readable recording medium of claim 11, wherein the determining a difference determines if a user not corresponding to the topic is speaking based on a difference between the identified user and the target of the agenda.

13. The non-transitory computer-readable recording medium of claim 11, wherein the determining a target predicts a set of behavior expected for the topic, and wherein the difference determination circuit determines if a difference between the set of behavior expected for the topic and the behavior of the identified user corresponding to the topic is greater than a threshold value.

14. The non-transitory computer-readable recording medium of claim 11, wherein the determining a target predicts a set of behavior expected for the topic, and wherein the determining a difference determines if a difference between the set of behavior expected for the topic and the behavior of the identified user corresponding to the topic is greater than a threshold value such that the determining a difference determines that the user corresponding to the topic has digressed from the target of the agenda.

15. A meeting management method implemented via a computer, comprising:

Determining, via the computer, a target of an agenda for a meeting, the target of the agenda including which users correspond to a topic on the agenda;

capturing, via the computer, behavior of the users during the meeting;

tracking, via the computer, and identifying the behavior of the users during the meeting and identifying a user of the users corresponding to the behavior;

a second determining, via the computer, if a difference between the behavior of the users and the target of the agenda for the topic is greater than a threshold value; and when the difference is greater than the threshold value, intervening in the meeting to interrupt the behavior of the users to guide the behavior back to the topic on the agenda, wherein the tracking and identifying identifies a topic of the agenda currently being discussed based on the user corresponding to the behavior and the behavior compared to the agenda, wherein the second determining further determines which user of the users caused the difference to be greater than the threshold value, wherein the target of the agenda for the meeting is obtained via an agenda ingest process of dividing a text of the agenda into an expected sequence of two or more topics and computing a feature representation for each topic, wherein the tracking the behavior of the users during the meeting is performed via a meeting interpretation process including transcribing speech into a transcript during the meeting, chunking the transcript into two or more temporal segments, and computing a feature representation for each segment, and wherein the intervening determines to intervene via an alerting process that includes comparing the feature representation for each segment against the feature representation for each topic and reporting deviations from the expected sequence of topics.

16. The method of claim 5, wherein the determining a difference determines, via the computer, if a user not corresponding to the topic is speaking based on a difference between the identified user and the target of the agenda.

17. The method of claim 15, wherein the determining, via the computer, a target predicts a set of behavior expected for the topic, and wherein the determining determines, via the computer, if a difference between the set of behavior expected for the topic and the behavior of the identified user corresponding to the topic is greater than a threshold value.

18. The method of claim 15, wherein the determining a target predicts a set of behavior expected for the topic, and wherein the determining a difference determines, via the computer, if a difference between the set of behavior expected for the topic and the behavior of the identified user corresponding to the topic is greater than a threshold value such that the determining a difference determines that the user corresponding to the topic has digressed from the target of the agenda.

* * * * *